United States Patent
Bradley et al.

(10) Patent No.: US 7,813,091 B2
(45) Date of Patent: Oct. 12, 2010

(54) LEAKAGE CURRENT DETECTOR INTERRUPTER WITH CONTINUOUS DUTY RELAY

(75) Inventors: Roger M. Bradley, North Bellmore, NY (US); Thomas Keating, Rockville Centre, NY (US); David Y. Chan, Bellerose, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 719 days.

(21) Appl. No.: 11/670,933

(22) Filed: Feb. 2, 2007

(65) Prior Publication Data

US 2008/0007880 A1   Jan. 10, 2008

Related U.S. Application Data

(60) Provisional application No. 60/764,894, filed on Feb. 3, 2006.

(51) Int. Cl.
  *H02H 3/16* (2006.01)
(52) U.S. Cl. ........................................ 361/42
(58) Field of Classification Search .................... 361/42
  See application file for complete search history.

(56) References Cited

U.S. PATENT DOCUMENTS

| | | | | |
|---|---|---|---|---|
| 4,943,886 A * | 7/1990 | Quazi | ........................ | 361/42 |
| 4,969,062 A * | 11/1990 | Barylak et al. | ................ | 361/42 |
| 6,282,075 B1 * | 8/2001 | Chaudhry | .................... | 361/111 |
| 2002/0089799 A1 * | 7/2002 | Juncu | ........................ | 361/42 |
| 2004/0070895 A1 * | 4/2004 | Gershen et al. | ................ | 361/42 |
| 2004/0070899 A1 | 4/2004 | Gershen et al. | | |

OTHER PUBLICATIONS

International Search Report dated Feb. 14, 2008.

* cited by examiner

*Primary Examiner*—Jared J Fureman
*Assistant Examiner*—Ann T Hoang
(74) *Attorney, Agent, or Firm*—Collard & Roe, P.C.

(57) ABSTRACT

An LCDI device comprising a first switching element coupled to a second switching element. A shield conductor coupled to the first switching element form a system that monitors output conductors of the device for faults. The second switching element is coupled to a relay that electrically connects input conductors of the device to output conductors of the device when the relay is energized by the second switching element. When a fault occurs, the first switching element generates a signal to the second switching element which de-energizes the relay causing said relay to electrically disconnect the input conductors from the output conductors.

19 Claims, 5 Drawing Sheets

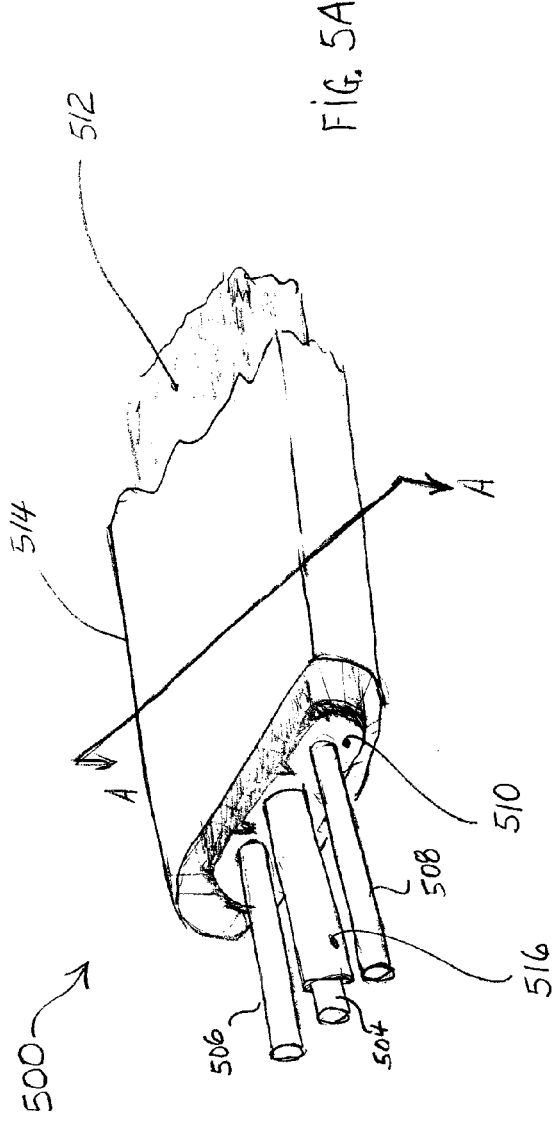
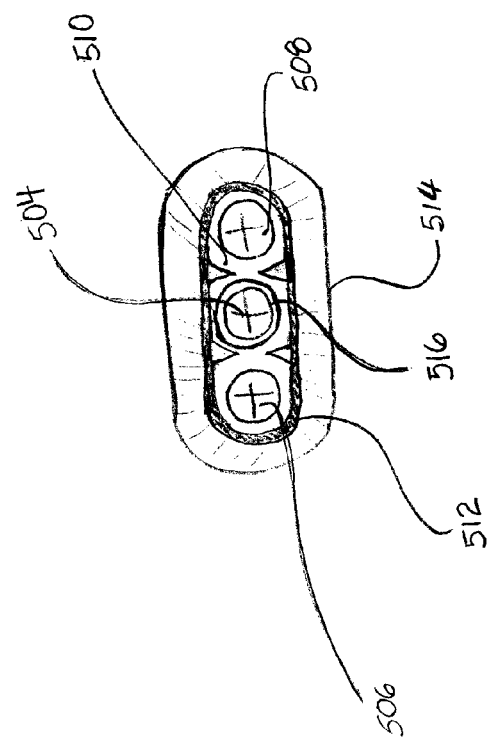
FIG. 5A
FIG. 5B

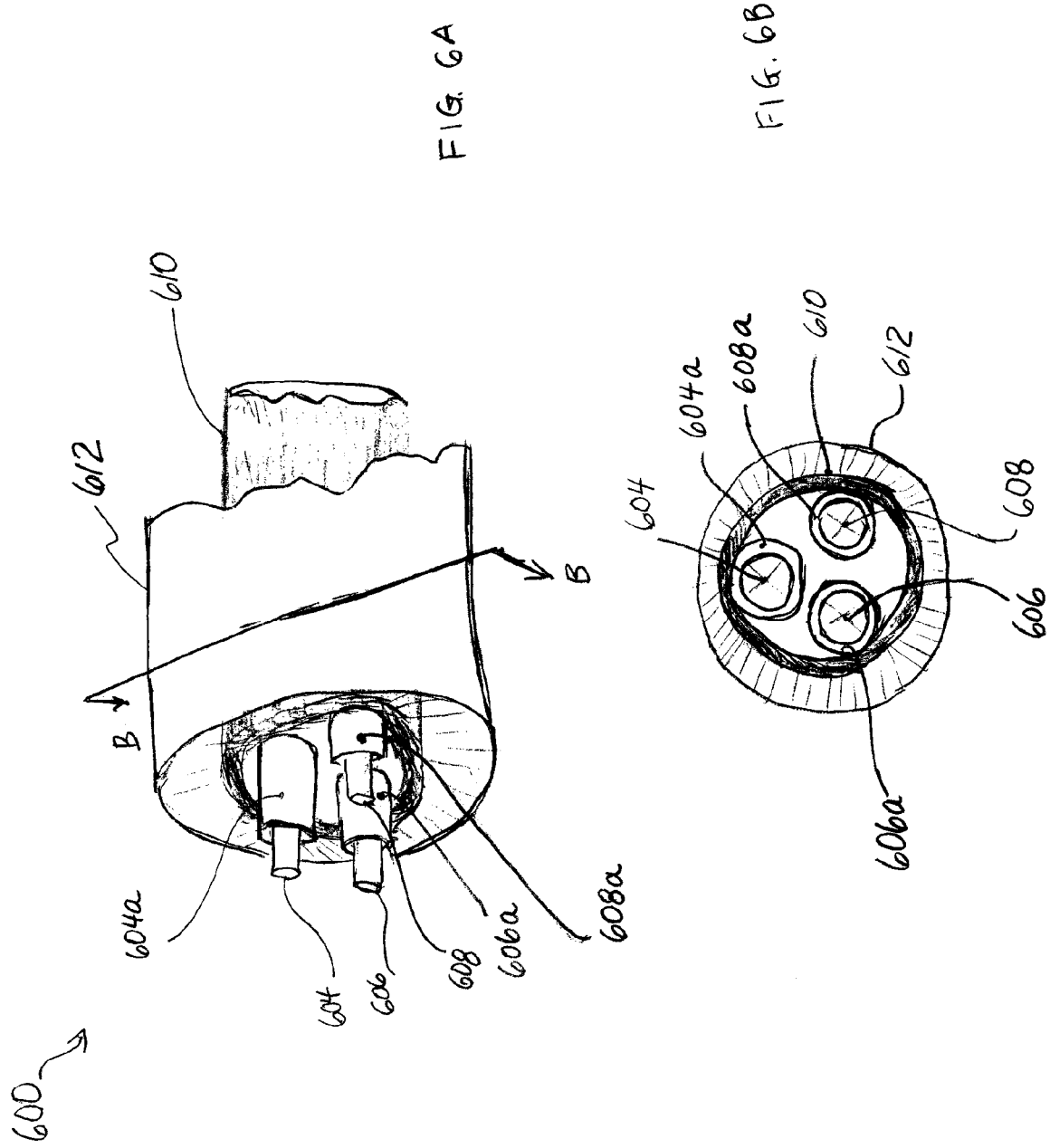

LEAKAGE CURRENT DETECTOR INTERRUPTER WITH CONTINUOUS DUTY RELAY

This application claims the benefit of the filing date of provisional application having Ser. No. 60/764,894 which was filed on Feb. 3, 2006.

FIELD OF THE INVENTION

This invention relates to resettable circuit interrupting devices, and more particularly to devices which interrupt current in a circuit when a leakage current is detected.

BACKGROUND OF THE INVENTION

Electrical power is generally delivered from an AC (Alternating Current) line power source to a load using conducting wires separated by insulating material. The power source, the electrical load, and the conductors between the power source and an electrical load form a circuit. Any unintended current leakage from any of the conductors in the circuit represents a hazardous condition, which may cause damage to the circuit, electrical shock or fire.

Power cords and extension cords for providing power to refrigerators, air conditioners, dehumidifiers and similar heavy-duty appliances generally have at least three wires (e.g. phase, neutral and ground) insulated from each other. These power cords are often used in environments where they are susceptible to damage. Degradation of the insulation around the wires in these cords may occur due to arcing, fire, overheating, physical or chemical abuse. It is therefore especially important to be able to detect leakage currents in such power cords, and to interrupt the circuit when a leakage current is detected.

Historically, leakage current has been detected and interrupted by fuses, circuit breakers and ground fault circuit interrupters (GFCIs). These types of interrupters are in widespread use in both commercial and residential environments. Fuses and circuit breakers interrupt power to a circuit when an excessive amount of current flows through the circuit for a predetermined period of time. However, the amount of leakage current required to cause shock, or start an electrical fire, can be much lower than the typical current required to burn a fuse or trip a breaker.

GFCIs, which are designed to protect against electrical shock, interrupt power to a circuit when the difference in current flowing through the phase and neutral wires exceeds a predetermined amount. The current difference is equal to the amount of current leaking out of the circuit from the phase or neutral conductors. The trip current of a GFCI, e.g., five milliamps, is typically lower than the amount required to cause shock or start an electrical fire. However, if the leakage current is between the phase and neutral wires of a damaged power cord, there will not be any differential current, but the resulting heat and arcing may be sufficient to start a fire.

Leakage current detector interrupters (LCDIs), can reliably detect leakage current from any conductor in a power cord, and may conveniently be incorporated into either the cord, the plug of that cord, or another suitable location in an electrical system. LCDIs typically consist of three elements: a shield incorporated into the power cord, proximal to all the conductors enclosed therein, so that a portion of the leakage current from any of the conductors will flow in the shield; a detector for detecting current flow in the shield; and a circuit interrupting mechanism that is activated by the detector when a predetermined level of current has flowed in the shield for a predetermined time. The predetermined level of current may be typically in the order of milliamps —much lower than the amount required to cause shock or start an electrical fire.

Circuit interrupters in general may have one of two types of interrupting mechanism. The first type is an intermittent-duty latched relay (known as a mousetrap style mechanism) and the second type is a continuous-duty relay. In a circuit interrupter with a continuous duty relay the main contacts are held closed, electromechanically, by a relay. The relay is normally open when not energized, i.e., when no power is applied to the relay; when energized, that is, when power is applied to the relay, it causes the main contacts to close. When an unwanted condition is detected, power to the relay coil is removed and the relay moves to its normally open condition.

SUMMARY OF THE INVENTION

The present invention is a Leakage Current Detector Interrupter (LCDI) which comprises a first switching element connected to a second switching element where the second switching element is configured to continuously energize a third switching element connecting one or more input conductors of the LCDI to one or more output conductors of the LCDI. The LCDI further comprises a sensing component that monitors the output conductors where said sensing component is coupled to said first switching element. The sensing component signals the first switching element when a fault (i.e., a leakage current) occurs due to any one or more of the output conductors causing said first switching element to control said second switching element so as to cause said second switching element to de-energize the third switching element causing the inputs of the LCDI to be disconnected from the outputs of the LCDI. The first switching element, the second switching element and the third switching element are part of internal circuitry having an internal reference point (e.g., circuit ground) that is different in terms of amplitude (e.g., voltage level) and phase from an external reference (i.e., external ground) conductor allowing the LCDI to also detect faults due to the external reference conductors.

BRIEF DESCRIPTION OF THE DRAWINGS

FIG. 5A illustrates a portion of a power cord which may be used with an LCDI in accordance with an embodiment of the invention.

FIG. 5B illustrates a view of the power cord of FIG. 5A cut along line A-A.

FIG. 6A illustrates a view of another implementation of a power cord which may be used with an LCDI in accordance with an embodiment of the present invention.

FIG. 6B illustrates a view of the power cord of FIG. 6A cut along line B-B.

DETAILED DESCRIPTION

An embodiment of the invention is a Leakage Current Detector Interrupter (LCDI) which comprises a first switching element coupled to a second switching element where the second switching element is configured to continuously energize a switch connecting one or more input conductors of the LCDI to one or more output conductors of the LCDI. The LCDI further comprises a sensing component that monitors the output conductors where said sensing component is coupled to said first switching element. The term "coupled" refers to an electrical, magnetic, optical or other connection that allows a signal to flow from one point or component to another point or component of a circuit or system. The signal may be an electrical, magnetic, optical or other well known signal type. The sensing component signals the first switching element when a fault (i.e., a leakage current and/or an open neutral condition) occurs causing said first switching element to control said second switching element so as to cause said second switching element to de-energize the third switching element causing the inputs of the LCDI to be disconnected from the outputs of the LCDI. The first switching element, the second switching element and the third switching element are part of device circuitry, (i.e., circuitry of the LCDI device of the present embodiment), having an internal reference point (e.g., circuit ground) that may be different in terms of amplitude (e.g., voltage level) and/or phase from an external reference (i.e., external ground) conductor allowing the LCDI of the present invention to also detect faults due to the external reference conductors. An external reference conductor is any electrical point on a conductor (or in circuitry) at least part of which is disposed within the housing of the LCDI device of the present invention that can be used or is used as a reference point for circuits that are not part of the device circuitry of the LDCI device of the present invention. The external reference conductor is electrically isolated from device circuitry and from the input and output conductors of the device. The device circuitry are the circuits (e.g., circuits shown in FIGS. 3 and 4) with which the LCDI device of an embodiment is constructed.

Figure 1:
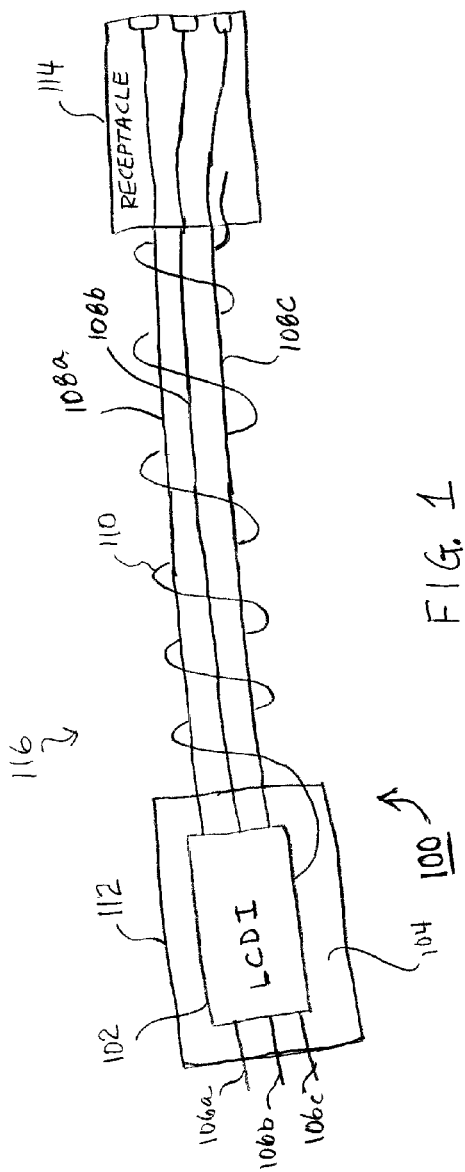
FIG. 1 is a schematic illustration of a shielded power cord incorporating a leakage-current detector interrupter (LCDI), in accordance with an embodiment of the invention.

The LCDI of the present can be implemented as a power cord 100 such as the one shown in FIG. 1. The cord has a cable portion 116 with a set of electrical conductors 108a, 108b, 108c, a plug 104 at one end and a receptacle 114 at the other end. The conductors in the cable portion are covered by insulation (not shown) and a conductive shield 110 is wrapped around them. The plug 104 has plug blades 106a, 106b, 106c for connecting to terminals of a line power source (not shown). The other end of the power cord has receptacle 114 which can be used to connect to an electrical device thus providing power to such a device. In a typical grounded 120V application, blades 106a, 106b, 106c connect to phase, ground and neutral terminals respectively; in such an application, conductor 108a is the phase or hot wire, conductor 108c is the neutral wire and conductor 108b is a ground wire. The ground wire is an external ground that is not at the same reference point as the internal or circuit ground of the LCDI 102 as will be explained infra. Hereinafter the term "phase" and the symbol "φ" will be used interchangeably. As shown in FIG. 1, a leakage current detector interrupter (LCDI) 102 is provided in the housing 112 of plug 104. The electrical device (not shown) being powered is connected to cord 100 at the receptacle 114. Cord 100 may be an extension cord as shown in FIG. 1. Alternatively, cord 100 may be a power cord integral with the electrical device whereby cable portion 116 is led through an opening in the housing of the device and receptacle 114 typically consists of a set of terminals inside the device. The device circuitry 102 has line connections (i.e., the plug blades) for connecting to a power source and load connections to the conductors in the cable, as described in more detail below. Although the embodiment is described as being a plug and cord arrangement, the leakage current detector of the invention may equally operate in any other suitable arrangement, as well.

The conductive shield 110 may be a mesh made of metal wires (e.g. copper) surrounding the insulation of the conductors; the conductive shield is typically covered by a flexible outer jacket. The number of conductors 108, and the design of receptacle 114, vary according to the application (e.g., three conductors for 120V, four conductors for 3-phase 240V).

Figure 2:
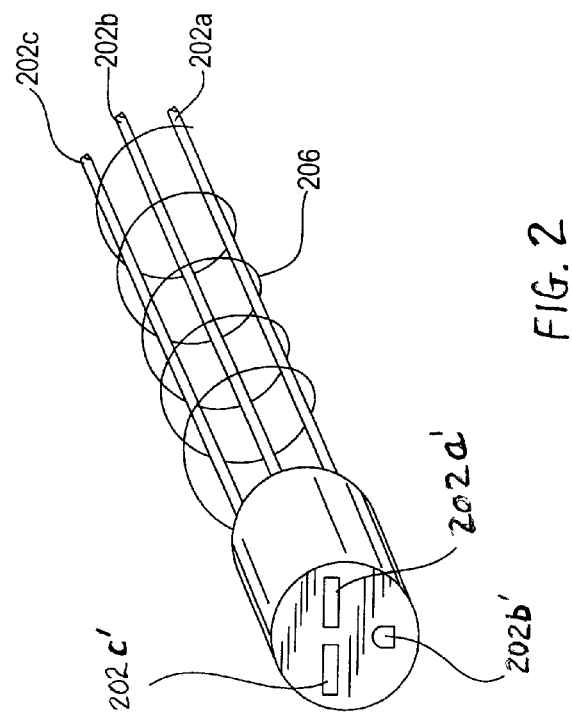
FIG. 2 illustrates the receptacle end portion of a shielded power cord.

FIG. 2 illustrates the receptacle end of a 240V cord having conductors 202a, 202b, 202c, wherein 202a is a first phase conductor, 202b is a ground conductor and 202c is a second phase conductor. (In a 120V application, one of the two phase conductors is a neutral conductor.) The conductors are connected to cavities 202a', 202b', 202c' in the body of the receptacle. Line connections are made to the ends of conductors 202a, 202b, 202c (on the right-hand side of FIG. 2), e.g. using plug blades; an electric load (i.e., an electrical device) is connected to the receptacle. Conductive shield 206, shown in FIG. 2, surrounds the conductors.

Figure 3:
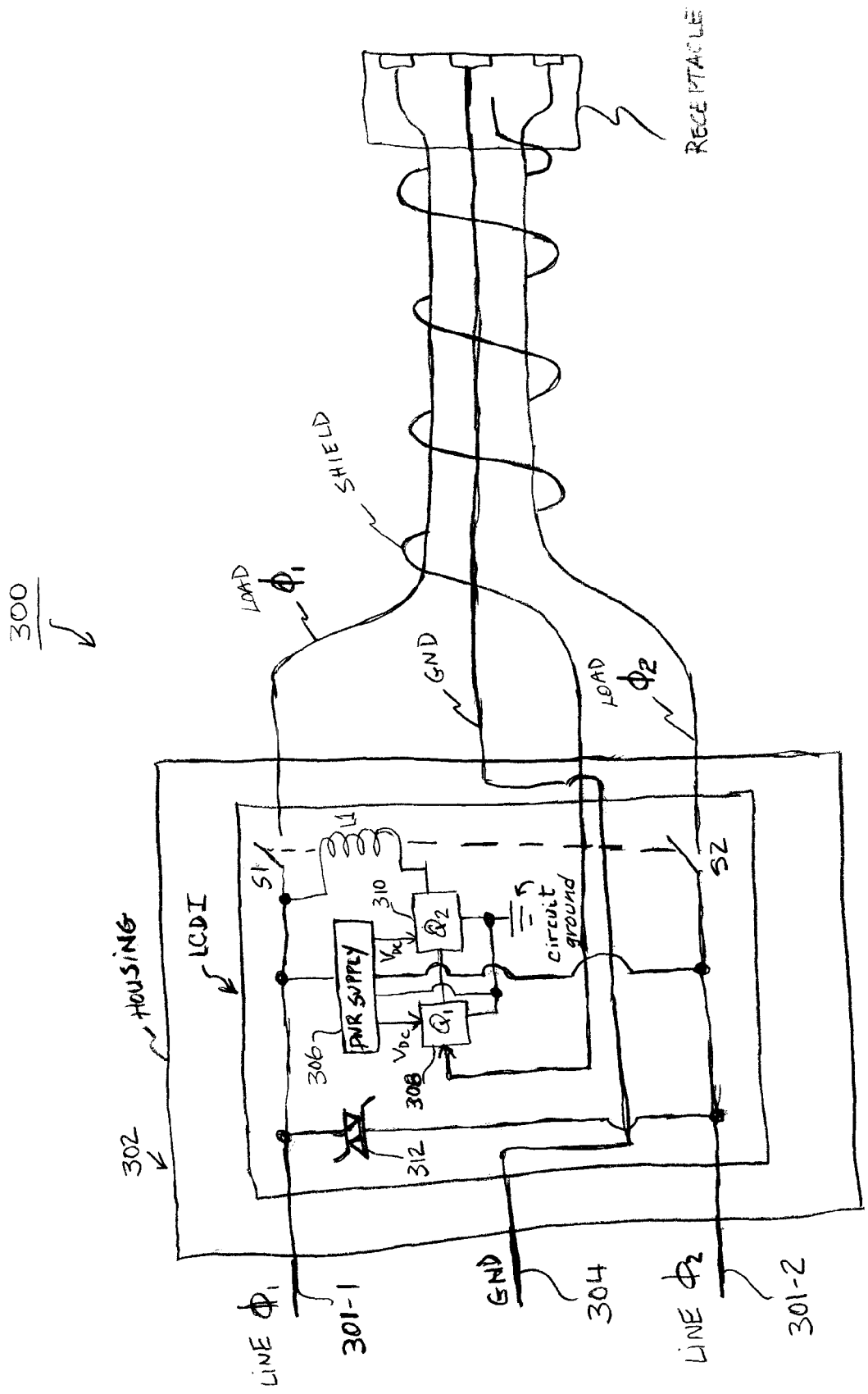
FIG. 3 is a block diagram of a power cord including an LCDI with a continuous-duty relay, in accordance with an embodiment of the invention.

FIG. 3 is a block diagram of a power cord 300 which includes an LCDI device in accordance with an embodiment of the invention. The design of the LCDI device is applicable to both 120V and 240V AC operation; the 240V application, with two input voltage phases, is shown and will be described in further detail. The power cord 300 has a plug 302 with three external line connections (typically realized as plug blades): connection 301-1 to line phase 1, connection 301-2 to line phase 2 and connection 304 to ground. Ground conductor 304 is an external ground that is different from the circuit ground of the LCDI device circuitry. Ground conductor 304 is not part of the device circuitry. Ground conductor 304 is one example of an external reference conductor. At least part of ground conductor 304 is located within the housing of the embodiment being discussed and is positioned proximally to input and output conductors within the device. The plug has an LCDI disposed therein whereby such LCDI is configured in accordance with the LCDI of the present invention. The LCDI may have a DC (Direct Current) power supply circuit 306 which has line φ$_1$ and line phase φ$_2$ as inputs voltage V$_{DC}$ as an output which provides power to switching elements 308 and 310 and associated electrical circuitry. The voltage V$_{DC}$ is an input to a switching element 308 which controls relay L1 via switching element 310. Switching element 310 is electrically connected to switching element 308 via conductive path 309. The plug may also have a current surge protection device 312 for diverting relatively large current surges from the LCDI thus protecting the circuitry of the LCDI. The surge protection device 312 is shown as an MOV (Metal Oxide Varistor). It should be noted that the surge protection device may alternately be implemented as any suitable device such as a spark-gap, for example. The third switching element, which connects the inputs of the LCDI to the outputs of the LCDI is implemented with a relay having relay coil L1 and relay contact switches S1 and S2. In the embodiment shown in FIGS. 1 and 2, the third switching element can be any component that can be controlled by a signal to allow an electrical conductive path between an input and an output conductor of the device. Relay coil L1 is energized continuously (i.e., a controlling signal energizing coil L1 is present) so as to maintain switch contacts S1 and S2 closed thereby connecting the inputs (line phase 1 and line phase 2) to the corresponding outputs (load φ$_1$ and load φ$_2$). Corresponding inputs and outputs share the same conducting paths were it not for the break in the path due to the open relay contact switches. For example, the corresponding output for line phase 1 is load phase 1 and the corresponding output for line phase 2 is load phase 2. Switch contacts S1 and S2 can be configured as spring biased contacts that spring open when relay coil L1 is not energized (i.e., de-energized). In the example shown, the third switching element is implemented as a continuous duty relay; that is, in order to maintain the switches $S_1$ and $S_2$ closed, coil $L_1$ is continuously energized. Switching element 310 is controlled by switching element 308 via connection 309 to continuously energize coil L1. It will be understood that the LCDI of the present invention is not limited to the implementation shown and that any switching element or system that is energized continuously to maintain switching contacts closed can be used.

As shown in FIG. 3, the conducting shield of the power cord is connected as an input to switching element 308 so that the switching element 308 can detect leakage current in the shield. Switching element 308 and the shield form a monitoring system that monitors all of the output conductors and is able to detect leakage current in the shield due to any one or more of the output conductors including the ground conductor. The monitoring system may contain circuitry associated with Q1 and Q2 as shown in more detail below in FIG. 4. Leakage current is any current that flows in the shield conductor from either the first phase, second phase or ground conductors all of which are part of the cable portion of cord 300. It should be noted that the ground conductor 304 is an external reference conductor. The circuit ground to which the internal circuitry of the LCDI of the present invention is connected is at a difference reference point or voltage than the ground conductor 304 which is an external reference point or voltage. Also, the circuit ground of the LCDI is caused to be out of phase with the external reference point to further differentiate the circuit ground (i.e., internal reference point) from the ground wire (i.e., external reference point). The external reference point is implemented with the external reference conductor referred to as the ground conductor. Because the two reference points are different, the LCDI of the present invention is thus able to detect leakage current flowing from the ground conductor 304 to the shield.

Generally, leakage current is any current that flows into the shield from any of the output conductors. As shown in FIG. 3, a cable comprising the shield conductor, the first phase conductor, the second phase conductor and the ground conductor provides the connection or conductive path between the receptacle and plug 302. When the plug is connected to a source of power (not shown) and the receptacle is connected to an electrical device (not shown) and there is no fault (i.e., no leakage current), switch contacts S1 and S2 are closed thus connecting power to the device via the LCDI, the cable and the receptacle. A fault is any circumstance or set of circumstances whereby the cable becomes damaged so as to cause electrical current to flow between one or more of the conductors (i.e., first phase conductor, second phase conductor, ground conductor) and the shield conductor resulting in a leakage current in the shield conductor. A fault is also the circumstance when any one of the input conductors forming an electrical connections between the LCDI of the present invention and a terminal of a power source connected to the LCDI is broken or has a discontinuity. When the input neutral conductor is broken, an open neutral condition is said to exist. When the input phase conductor is broken, an open phase condition is said to exist. The input conductors of the embodiment of the present invention being discussed is electrically connected to a power source. That is, at least one of the input conductors is connected to a phase terminal or phase pole of the power source and at least one other input conductor is connected to a neutral terminal or neutral pole of the power source. The embodiment shown has at least one input phase conductor and at least one input neutral conductor. In some applications where there is a plurality of input conductors, one of said input conductors can be used as a neutral conductor. When the device is reset and an open neutral condition or an open phase condition occurs, the device trips.

The combination of the shield, first and second phase conductors and ground conductor, is insulated by a flexible material (not shown in FIG. 3). The shield is configured within the cable so that any leakage current from any of the other conductors in the cable flows into the shield. The shield and switching element 308 and associated circuitry form a monitoring system that monitors all of the conductors (at the same time) in the cable so that if any one or more of such conductors is leaking current above a defined amount for a defined period of time, the monitoring system along with electrical components (to be discussed infra) will detect such leakage and cause a signal to be generated to switching element 310. The threshold value and period of time are defined by the manufacturer of the LCDI based on user/governmental specifications and/or industry standards. When a fault is detected, first switching element 308 generates a signal to second switching element 310 and associated circuitry which in turn generate a signal to the third switching element (i.e., a relay comprising a coil L1 and switch contacts S1 and S2) de-energizing said third switching element causing the inputs to be disconnected from the outputs (i.e., S1 and S2 are open). The shield is one example of a sensing component; the shield and various electrical components to be described infra form a sensing circuit that senses the leakage current and signals to switching element 308 to allow switching element 308 to react or not to react to the detected leakage current; a leakage current that is deemed a fault has a certain amplitude and last for a certain period of time both of which are equal to or more than respective thresholds set by a user or manufacturer, industry standard and/or governmental standards.

Figure 4:
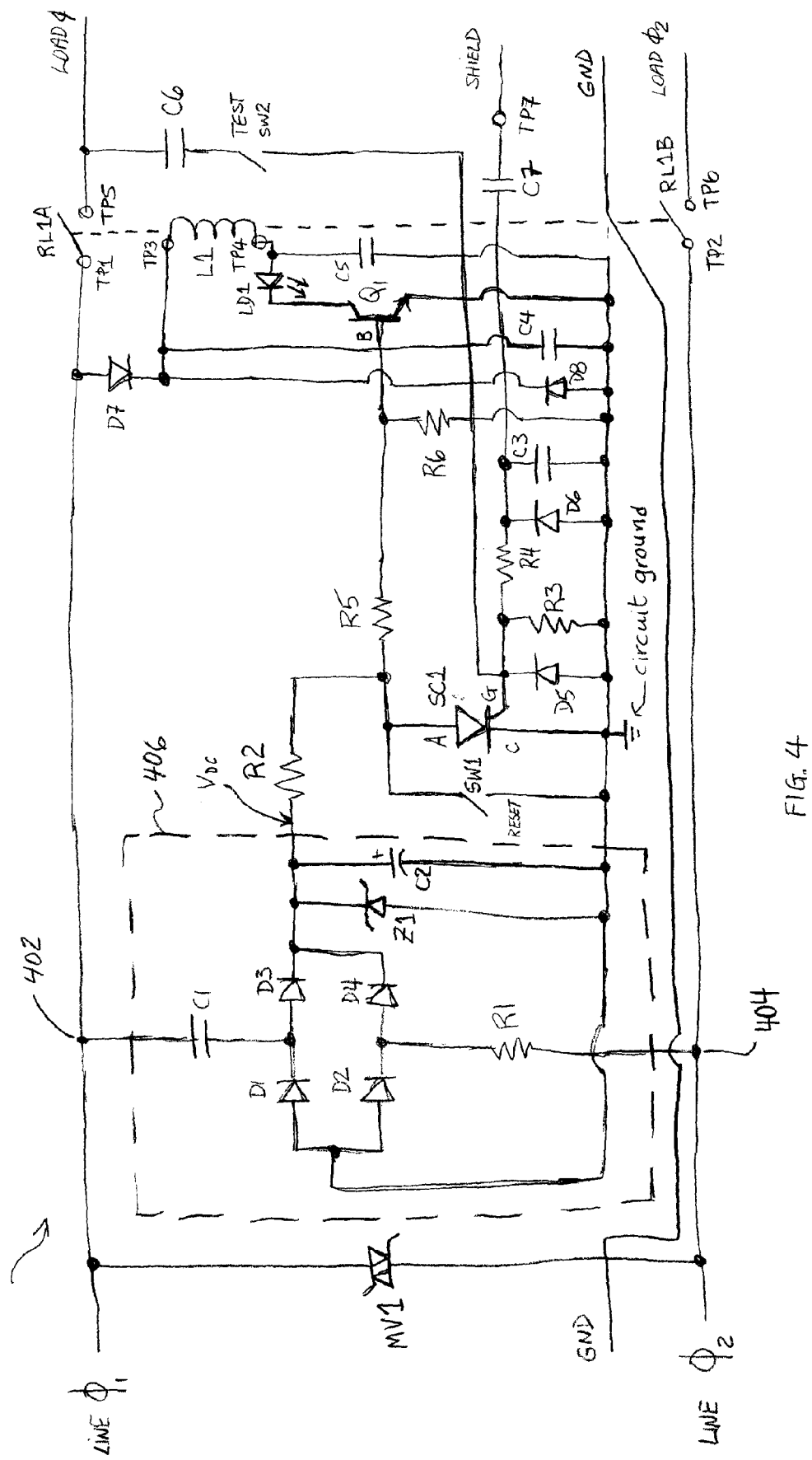
FIG. 4 is an electrical schematic diagram of an LCDI with a continuous-duty relay, in accordance with an embodiment of the invention.

Referring now to FIG. 4, there is shown an electrical schematic diagram of an LCDI 400 with a continuous-duty double-pole relay, in accordance with an embodiment of the present invention. Relay contacts RL1A (between terminals TP1 and TP5) and RL1B (between terminals TP2 and TP6) are normally open and are closed only when coil L1 (between terminals TP3 and TP4) is energized.

The LCDI circuitry is powered by a DC power supply 406 which has a full-wave bridge diode network with diodes D1, D2, D3 and D4. The power supply 406 also has a biasing network of R1 and C1. Capacitor C2, connected between the bridge output and circuit ground provides smoothing of a fully rectified AC signal. The AC signal is applied to the power supply at points 402 and 404. Zener diode Z1, connected parallel to capacitor C2, acts as a voltage regulator. Capacitor C2 provides some filtering of the regulated voltage from Zener diode Z1. The output of the diode bridge appears across the series of resistors R2, R5 and R6. A DC voltage at the node between R2 and R5 is thus applied to the anode terminal of Silicon Controlled Rectifier (SCR) SC1. SC1 is a switching semiconductor device having three terminals: A is the anode terminal; C is the cathode terminal and G is the gate terminal. The DC voltage at the node between R5 and R6 is likewise applied at the base terminal B of transistor Q1. Thus, the particular implementation shown in FIG. 4 for the LCDI of the present invention uses SCR SC1 as the first switching element and transistor Q1 as the second switching element. The relay comprising coil L1, switch contacts S1 and S2 is one the specific implementation of the third switching element shown in FIGS. 3 and 4. It should be noted that first switching element, the second switching element and the third switching element may be implemented by any suitable switching device, such as a transistor, FET (Field Effect Transistor), or triac, for example. Note that each of said examples of the switching element has a control input and when a proper signal is applied to said control input the switching element will allow a signal path to exists between its input and output; i.e., its input is connected (e.g., electrically, optically, magnetically) to its output. The first, second and third switching elements can be electrical electronic, electrooptic or electromechanical devices or components that can be controlled by a signal to connect two distinct points to each other; that is, to allow current or other signal to flow from one point of the device to another point of the device when a proper signal is applied to its control input. The two points are otherwise isolated from each other so that without the presence of the proper signal (i.e., the controlling signal) at the control input there is no signal flow between the two points. The controlling signal can be electrical, optical or magnetic. The switching elements as defined each has at least two portions where current or other signal flows from one portion to the other portion when a proper signal is applied to the control input of said switching elements. A switching element is continuously energized when a controlling signal is present. The controlling signal can be a constant signal or a varying signal.

It should be noted that the DC power supply voltage may float between the two phases (in a 240 VAC application) or between phase and neutral (in a 120 VAC application). In particular, as shown in FIG. 4, the bridge rectifier circuit D1-D4 is connected to line $\phi_1$ through capacitor C1 at point 402, and to line $\phi_2$ through resistor R1 at point 404. Resistor R1 and capacitor C1 serve as a bias network for the diode bridge resulting in a reference voltage (i.e., an internal reference point for the device circuitry or circuit ground as shown) for the diode bridge that is at a different potential than the ground reference of the 240 VAC application. The ground reference of the 240 VAC application is the GND wire shown and is an external reference point that is different in terms of voltage level and phase from the circuit ground shown and is thus not part of the device circuitry. In a 240 VAC application, typically, the circuit ground (i.e., reference point for the device circuitry) is set midway between the input voltages (appearing at points 402 and 404) to the power supply. However, here, C1 and R1 act as a biasing network that sets the reference voltage at a point slightly off the midpoint between the input voltages to the power supply. Thus, the LCDI circuit ground would necessarily be at a different potential than an outside ground connected to the LCDI via the plug or receptacle. The potential difference between LCDI circuit ground and the ground outside of the LCDI allows the LCDI to detect leakage current from an outside ground. Further, because of the use of C1, the LCDI circuit ground is caused to be out of phase with the ground from an outside point making the two grounds even more different with respect to each other. As a result of the two distinct grounds, leakage current flowing from the outside ground to the shield can be detected by the LCDI circuitry.

The relay coil is powered from a phase of the line voltage (line phase 1 in FIG. 4) by a power supply implemented with a half wave rectifier comprising diodes D7 and D8. It should be noted that this power supply is referenced to the same ground (i.e., circuit ground) as power supply 406. Capacitor C4, between diode D7 and circuit ground, provides smoothing of the voltage output of the half-wave power supply, so that the current in the relay coil is sufficient to keep the contacts closed (without chatter) at AC voltages close to 50% of normal.

When transistor Q1 is in a conducting state, current flows through relay coil L1 and Light Emitting Diode (LED) LD 1. Since LED LD 1 is connected in series with coil L1, the LED is energized whenever the coil is energized, and thus provides a visual indication that the relay is energized and thus the load is connected to the phase voltage.

When no leakage current is present in the shield, power supply 406 supplies voltage (through a voltage divider of R2, R5 and R6) to the base B of transistor Q1 so that the transistor is energized. The energized transistor Q1 permits current to flow through the relay coil L1, causing relay contact switches RL1A and RL1B to be closed. The device is said to be in the reset state. That is, Q1 is being energized continuously so as to keep RL1A and RL1B closed.

When leakage current is present in the shield, a voltage appears at the gate of the SCR (that is, at the node between resistors R3 and R4 and the cathode of diode D5). The resistors R3 and R4 as connected provide a divided voltage to the gate of SC1. This voltage, when of a defined amplitude and lasting for a certain defined period of time (defined by a user, manufacturer, government or industry) causes the SCR SC1 to conduct current (supplied by power supply 406) from its anode to its cathode pulling the anode voltage (also the voltage at the node between R2 and R5) close to circuit ground. This effectively grounds the base terminal B of transistor Q1, causing transistor Q1 to turn off. In essence the first switching element (e.g., SC1) sends a signal (e.g., ground voltage) to the second switching element (transistor Q1) causing said second switching element to de-energize the switch (e.g., de-energize coil L1) allowing the switch (viz., switch contacts) to open disconnecting the input conductors from the output conductors. The switch contacts are normally biased open. Consequently, Coil L1 and LED LD1 cease to conduct current, so that the relay contacts open, disconnecting the conductors of the power cord from the AC line power supply. The LCDI is then said to be in a tripped state; that is relay contact switches RL1 and RL2 are open.

After the relay contact switches open, the flow of leakage current to the LCDI switching circuit ceases causing the voltage at the gate of the SCR to be removed. It should be noted that the SCR will stay ON—that is, continue to conduct DC current provided by power supply 406 through resistor R2 as long as such current exceeds a characteristic "holding current." The holding current is a certain current value at or above which a conducting SCR will continue to be switched ON and conduct; that is, after an SCR is switched ON, it will remain ON as long as a current equal to or more than the holding current is provided to the SCR. The values of the clamping voltage in Zener diode Z1 and resistor R2 are chosen so that $V_{DC}/R2$, the DC current from power supply 406 to the anode of the SCR, exceeds the holding current. Accordingly, the LCDI will remain in the tripped state until the fault is corrected and the device is reset.

Several other components shown in FIG. 4 aid in reliable operation of the LCDI device. Resistors R4 and R3 form a voltage divider between shield connection TP7 and circuit ground, thereby limiting current to the gate of the SCR and setting the sensitivity of the SCR. Diode D5 acts as a clamp, ensuring that the gate of the SCR is not at a voltage lower than the cathode. Diode D6 and capacitors C3 and C7, between shield connection TP7 and circuit ground, filter noise from the shield to prevent false tripping; capacitor C3 also prevents the SCR from firing during voltage spikes on the AC line. Capacitor C7 also acts as a DC blocking capacitor. The shield along with at least the following components: capacitor C7, resistors R3 and R4, diode D5, diode D6 and capacitor C3 form a sensing circuit. Also, protection against voltage surges is provided by the metal-oxide varistor (MOV) MV1. It should be noted that the surge protection device may alternately be implemented as any suitable device such as a spark-gap, for example.

The device of FIG. 4 may be reset by closing reset switch SW1 using a RESET button (not shown) coupled to and capable of engaging reset switch SW1. When reset switch SW1 is closed, it, short circuits the SCR. As a result, the holding current from the power supply is diverted from the SCR and now flows through switch SW1. With very little or no current flowing through it or at the very least, with current less than the holding current flowing through it, the SCR is caused to turn OFF. When the switch SW1 is then released or reopened, current from power supply 406 is again directed through the voltage divider R2, R5, R6, so that the voltage at base terminal B of transistor Q1 returns to its previous value and transistor Q1 again conducts current. As a result of Q1 conducting, current again flows through relay coil L1 and LED LD1. Switch SW1 can be implemented as a momentary type switch. Alternatively, the LCDI of the present invention can be reset by turning off the AC power, which shuts off the power supply 406 and in turn resets the SCR. If a leakage current is still present after the reset procedure, the LCDI will immediately trip again. In accordance with the preferred embodiment described here, the reset operation described above, as an added benefit, it should be noted that the LCDI can also protect against an open neutral condition since the neutral connection is required to supply power to the circuit to energize the relay. In addition, if the LCDI is in the reset state, if the connection to the neutral pole of the supply power is lost, the LCDI will automatically trip and enter the tripped state.

While in the reset state, the device may be tested by closing test switch SW2 using a TEST button (not shown) that is coupled to and capable of engaging test switch SW2. Test switch SW2 establishes a TEST connection between load phase 1 and the SCR. When test switch SW2 is closed a voltage (AC voltage half wave rectified and filtered) appears at the gate of the SCR, causing the SCR to switch ON as described above. Capacitor C6 conducts sufficient TEST current to cause the SCR SC1 to turn ON, while also performing filtering fimctions similar to that of capacitor C7. When SC1 is turned ON, Q1 is turned OFF deenergizing coil L1 allowing switches RL1A and RL1B to open; the device is thus in the tripped state. Switch SW2 is preferably a momentary-type switch, so that the device may be conveniently reset after testing.

In the 240 VAC embodiment of the LCDI device described above, the LCDI device will trip whenever there is leakage current from either the load phase 1, the load phase 2 or ground conductors. Similarly, in a 120 VAC application, the device will trip whenever there is leakage current from either the load phase, load neutral or ground conductors.

Referring now to the cable portion of the LCDI of the present embodiment of the invention. FIG. 5A illustrates the cable portion of a power cord according to an embodiment of the invention. Cable portion 500 has three conductors 504, 506, 508; 504 is the ground conductor while 506 and 508 are phase conductors in a 240 VAC application (phase and neutral in a 120 VAC application). Ground conductor 504 is surrounded by insulation material 516. Phase conductor 506 is surrounded by insulation 510; similarly, conductor 504 and insulation material 516 are also surrounded by insulation 510. Insulation material 516 is used in flat power cables such as the cable shown in FIGS. 5A and 5B and is usually colored green so as to be easily recognized or facilitate identification of the ground wires when the outer insulation is stripped. Also conductor 508 is surrounded by insulation 510. The phase conductors 506, 508 and ground conductor 504 and insulation 510 are all surrounded by shield conductor 512. Shield conductor 512, which may be made of braided wire, wraps around insulation 510 as shown. All the conductors, including shield conductor 512 are surrounded by a non-conductive outer jacket or external insulation 514 which may be of a flexible material. FIG. 5B illustrates the cord of FIG. 5A along line A-A. The conductors are aligned horizontally within insulation 510 which is a one piece component. External insulation 514 may be made of the same or different material than internal insulation 510.

Another configuration for the power cord of the LCDI of the present invention is shown in FIGS. 6A and 6B. Cable portion 600 has three conductors 604, 606, 608; 604 is the ground conductor while 606 and 608 are phase conductors in a 240 VAC application (phase and neutral in a 120 VAC application). Ground conductor 604 as well as phase conductors 606 and 608 are surrounded by internal insulators 604a, 606a and 608a respectively. The phase conductors 606, 608 and ground conductor 604 and corresponding insulation 606a, 608a, 604a are all surrounded by shield conductor 610. Shield conductor 610, which may be made of braided wire, wraps around insulation the three conductors as shown. All the conductors, including shield conductor 610 are surrounded by a non-conductive outer jacket or external insulation 612 which may be of a flexible material. FIG. 6B illustrates the cord of FIG. 6A along line B-B. The conductors are positioned to form a triangle with the shield surrounding all three conductors. External insulation 612 may be made of the same or different material than internal insulation 604a, 606a and 608a. It should be noted that any other suitable cord configuration may be used without departing from the spirit of this application.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A leakage current detector interrupter device comprising:
   at least one input conductor;
   at least one output conductor;
   a first switching element;
   a second switching element coupled to the first switching element;
   a third switching element coupled to the second switching element where at least part of the third switching element is electrically connected to the at least one input conductor of the device and another part of said third switching element is electrically connected to the at least one output conductor of the device and the at least one input conductor is electrically isolated from the at least one output conductor; and
   at least one external reference conductor;
   the first switching element, the second switching element and the third switching element being part of device circuitry having a point of reference different from a point of reference of said at least one external reference conductor of the device where the second switching element continuously energizes at least part of the third switching element causing said third switching element to electrically connect the at least one input conductor to the at least one output conductor wherein the point of reference for the device circuitry is different in voltage and phase from the point of reference of said at least one external conductor.

2. The leakage current detector interrupter device of claim 1 where the third switching element is open when not energized so as to maintain electrical isolation between the at least one input conductor and the at least one output conductor.

3. The leakage current detector interrupter device of claim 1 where the first switching element controls the second switching element to de-energize the third switching element causing said third switching element to electrically disconnect the at least one input conductor from the at least one output conductors when a fault is detected by the first switching element.

4. The leakage current detector interrupter device of claim 1 where the first switching element is a Silicon Controlled Rectifier.

5. The leakage current detector interrupter device of claim 1 where the second switching element is a transistor.

6. The leakage current detector interrupter device of claim 1 where the point of reference of the device circuitry is circuit ground.

7. The leakage current detector interrupter device of claim 1, where the external reference conductor is a ground conductor.

8. The leakage current detector interrupter device of claim 1 where the fault is leakage current flowing from the at least one output conductor to a shield conductor coupled to the first switching element.

9. The leakage current detector interrupter device of claim 1 wherein said at least one input conductor is configured to be connected to a power source and said at least one input conductor further comprises a plurality of input conductors configured to be connected to said power source, said power source having a neutral terminal, such that said plurality of input conductors further comprises at least one neutral conductor wherein said fault is when said neutral conductor is not electrically connected to said neutral terminal of said power source.

10. The leakage current detector interrupter device of claim 1 wherein said at least one input conductor is configured to be connected to a power source and said at least one input conductor further comprises a plurality of input conductors configured to be connected to said power source, said power source having a phase terminal, such that said plurality of input conductors further comprises at least one phase conductor wherein said fault is when said phase conductor is not connected to said phase terminal of said power source.

11. The leakage current detector interrupter device of claim 1 where a sensing component is coupled to the first switching element and associated circuitry to form a system that simultaneously monitors all of the conductors to detect a fault and generate a signal to the second switching element.

12. The leakage current detector interrupter device of claim 1 where a sensing component is coupled to the first switching element and associated circuitry to form a system that simultaneously monitors at least one of the conductors to detect a fault and generate a signal to the second switching element.

13. The leakage current detector interrupter device of claim 1 where the second switching element is coupled to a coil and continuously energizes said coil which operates the third switching element to electrically connect the at least one input conductor to the at least one output conductor.

14. The leakage current detector device of claim 1 further comprising a reset button coupled to a reset switch electrically connected to the first switching element such that when the device is in a tripped state and the reset button is depressed and then released the reset switch causes the first switching element to continuously energize the third switching element to electrically connect the at least one input conductor to the at least one output conductor.

15. The leakage current detector device of claim 1 further comprising a test button, and a leakage current detector with said test button being coupled to said leakage current detector such that when the device is in a reset state and the test button is depressed said at least one input conductor is electrically disconnected from the at least one output conductor.

16. The leakage current detector device of claim 1 further comprising a test button coupled to a test switch electrically connected to the first switching element such that when the device is in a reset state and the test button is depressed the test switch causes the first switching element to deenergize the third switching element resulting in the at least one input conductor being electrically disconnected from the at least one output conductor.

17. A leakage current detector interrupter device comprising:
a first switching element;
a second switching element coupled to the first switching element;
at least one input conductor;
at least one output conductor;
at least one external reference conductor; and
a third switching element coupled to the second switching element where at least part of the third switching element is electrically connected to the at least one input conductor of the device and another part of the third switching element is electrically connected to the at least one output conductor of the device where the second switching element in response to a signal from the first switching element continuously energizes at least part of the third switching element causing said third switching element to electrically connect the at least one input conductor to the at least one output conductor wherein the point of reference for a set of device circuitry is different in phase from the point of reference of said at least one external conductor.

18. The leakage current detector interrupter device as in claim 17, wherein the point of reference for the device circuitry is different in both voltage and phase from the point of reference of said at least one external conductor.

19. The leakage current detector interrupter device of claim 18, where the external reference conductor is a ground conductor.

* * * * *